United States Patent Office 2,972,255
Patented Feb. 21, 1961

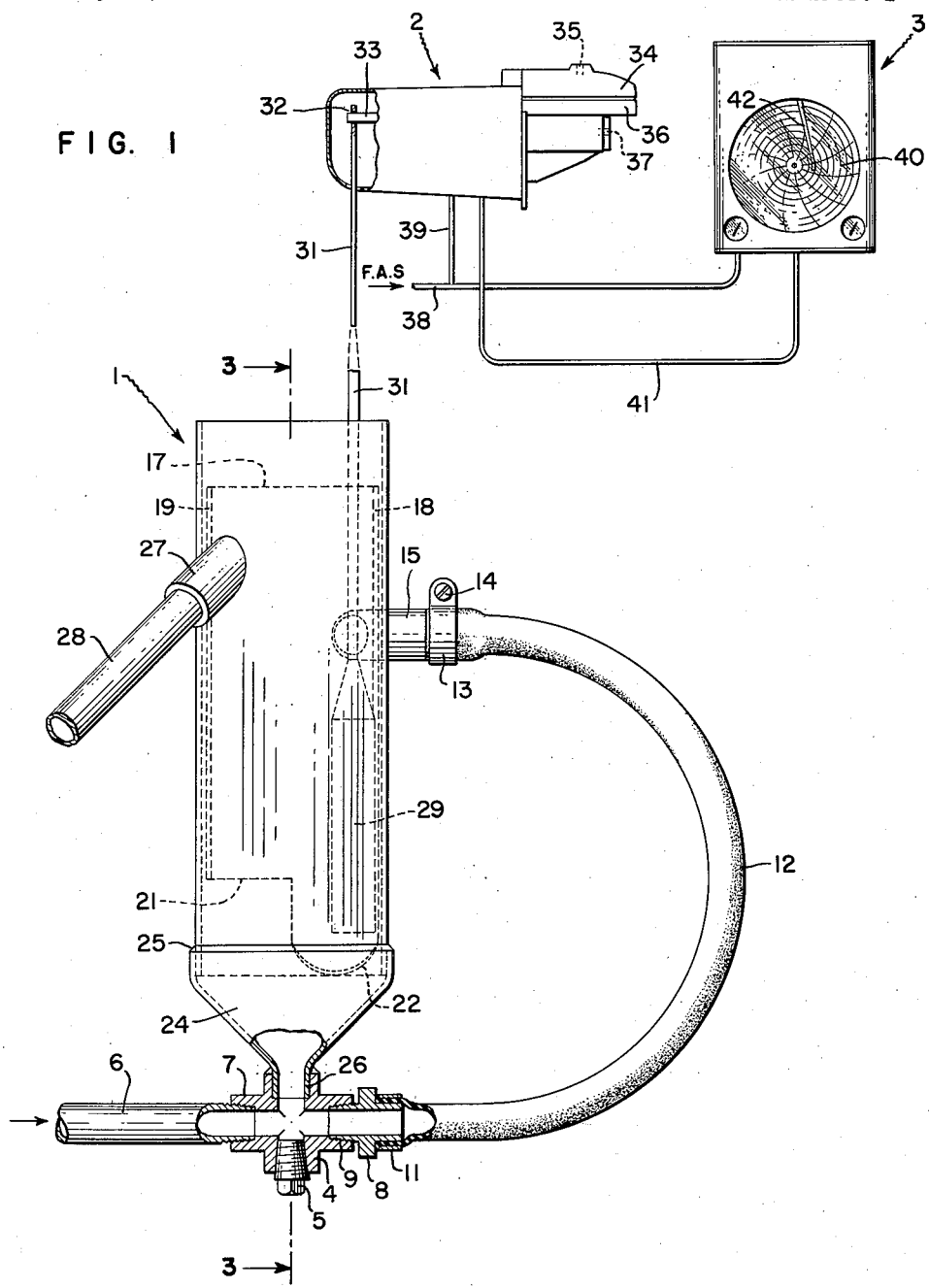

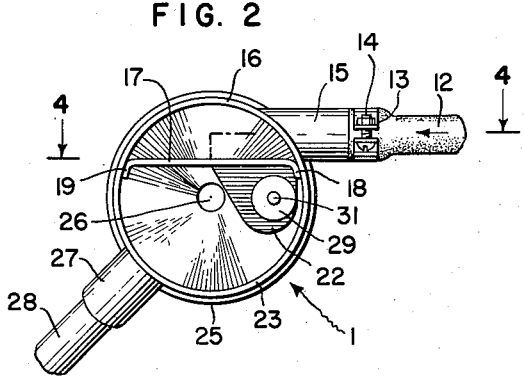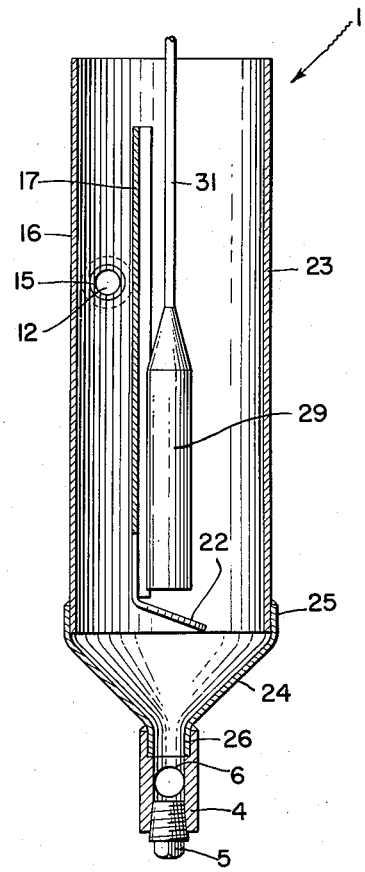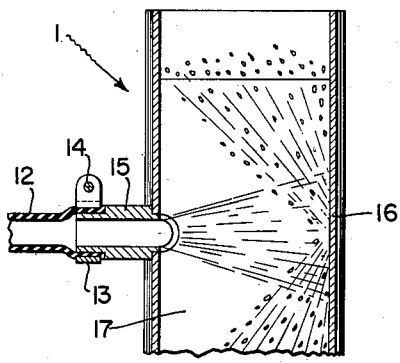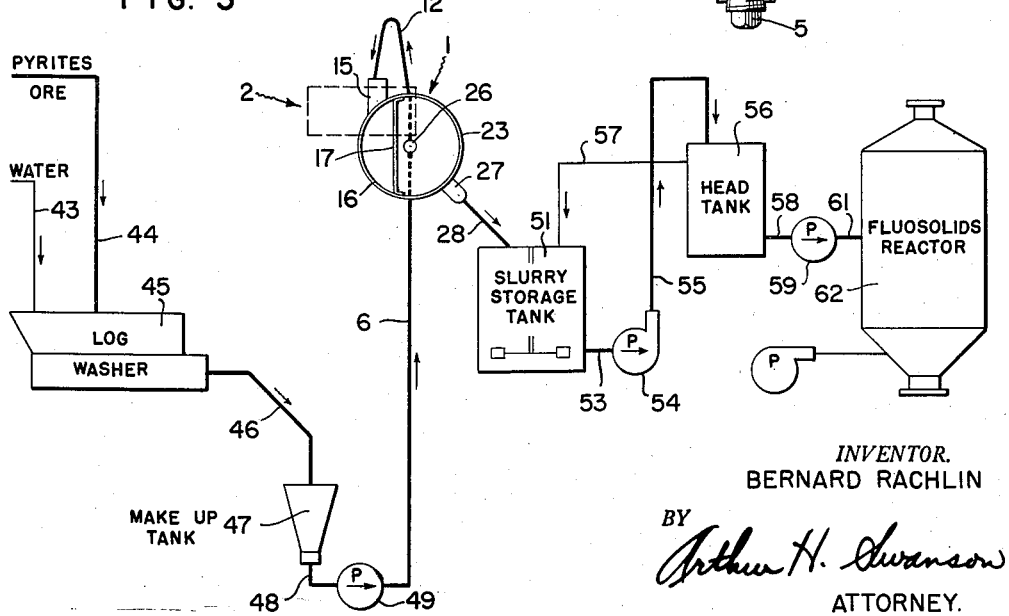

2,972,255

DENSITY MEASURING APPARATUS

Bernard Rachlin, Havertown, Pa., assignor to Minneapolis-Honeywell Regulator Company, Minneapolis, Minn., a corporation of Delaware Filed May 21, 1956, Ser. No. 586,011

2 Claims. (Cl. 73—452)

A general object of the present invention is to provide a measuring apparatus which will automatically and accurately record any minute changes in the specific gravity of a fluid being transmitted through a flow line.

More specifically, the measuring apparatus of the present invention is devised and well suited for measuring the specific gravity of a slurry. Heretofore, when a specific gravity measuring apparatus was employed to measure the density of a slurry accurate measurements of such a slurry could not be accomplished as certain solids in the slurry would settle out of the slurry and clog up the apparatus. It is therefore a more specific object of the present invention to provide a specific gravity measuring apparatus which will not clog up when the aforementioned solid materials in a slurry settle out, in, for example, a Dorrco fluo solids system that is used in the roasting of sulphides for sulphur dioxide production wherein a heavy slurry of pyrites ore and water with a specific gravity between 2.60 and 2.65 is required to be pumped into a reactor.

It is a more specific object of the present invention to provide a measuring apparatus that is comprised of a sampling chamber that contains an open drain through which the aforementioned solid particles in the slurry may flow directly into a flow line that is transmitting slurry to the sampling chamber.

It is still another specific object of the present invention to provide such a measuring apparatus with a sampling chamber that will dampen out unwanted flow surges and pulses that occur in such a slurry when the slurry is being transmitted at either a constant or a varying rate through a transmission line to such a sampling chamber.

Another object of the invention is to provide the aforementioned sampling chamber with a baffle member that will prevent surges or pulsations in the slurry flowing into such a chamber from affecting the apparent movement of a density measuring displacer element placed in the chamber.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a front elevation view of the measuring apparatus;

Fig. 2 shows a top plan view of the sampling chamber shown in Fig. 1;

Fig. 3 shows a cross sectional elevation view of the container taken on section line 33 of Fig. 1;

Fig. 4 shows a sectional view of the container taken on section line 44 of Fig. 2; and Fig. 5 shows how the measuring apparatus shown in Fig. 1 may be used to advantage in a Dorrco fluo solids system that is used in the roasting of sulphides for sulphur dioxide production.

Unless otherwise noted, corresponding components shown in the various figures carry corresponding reference characters.

Fig. 1 of the drawings shows a sampling chamber 1, a feedback specific gravity pressure transmitting unit 2 and a recorder 3 which constitutes the specific gravity measuring apparatus referred to supra. As can be seen by observation of Figs. 1, 2, 3, and 4, the sampling chamber and its associated connections is comprised of a cross 4, a standard pipe plug 5 threadedly connected into the lower portion of the cross 4, a fluid transmission line 6 threadedly connected by means of the threads 7 to the left end of the cross 4. A hose connection 8 is shown threadedly connected by means of the thread 9 through the right end of the cross 4 and a suitable clamp 11 is shown retaining one end of a flexible conduit 12 in a fluid type engagement with the outer surface of a portion of the connection 8. The other end of the flexible conduit 12 is shown connected by means of a hose clamp 13 that is comprised of a suitable screw tightening means 14 to a fluid inlet port connection 15. Such an inlet port connection 15 may best be seen in Figs. 1 and 5. The inlet port connection may be welded to a first wall portion 16 that forms a middle portion of the sampling chamber 1 on one side of the baffle 17. The right lateral end 18 of this baffle 17, as can be best seen in Fig. 2 of the drawings, is fixedly connected to the chamber 1 by suitable welding material. The left lateral end 19 of this baffle 17 is likewise fixedly connected to the wall of the chamber 1. The upper end of the baffle 17 is shown in Figs. 1 and 5 as being in a horizontal plane. The lower left side portion 21 of the baffle 17 is shown terminating at a much higher point along the longitudinal axes of the baffle 17 than is the lower right bent portion 22 of this baffle. As can best be seen in Fig. 2 of the drawings, a second wall portion 23 is shown forming the remaining other part of the middle portion of the sampling container 1. The lower end of the container 24, as is best shown in Figs. 1 and 3, is of a funnel shaped configuration. The upper end 25 of this lower end portion of the container 24 is shown fixedly connected by suitable welding material to the lower portion of the chamber 1 and the lower end portion 26 of this funnel shaped end is also connected by suitable welding material to the upper end portion of the cross 4.

As can best be seen in Figs. 1 and 2, the chamber 1 also contains a fluid outlet port 27 which is fixedly attached in a manner similar to the inlet port 15 to the chamber 1. However, this fluid outlet port protrudes in outward angular direction and may be connected in any suitable fashion to an outlet fluid transmitting line 28. The aforementioned container and its associated parts may, if desired, have their inner surfaces coated with a polyvinyl chloride plastic coating or any other surface preserving coating.

As can best be seen in Figs. 1 and 3, a displacer 29 is shown suspended in the chamber 1 on that side of the baffle 17 that contains the second wall portion 23 of the container. As shown in Fig. 1, the upper end portion of this displacer 29 contains a thin rod extending member 31 that is connected at its upper end by means of a double knife edge 32 shown or any other suitable pivotal hook connection to a force balancing means 33 of the transmitter 2. This force balance specific gravity transmitting unit 2 may be similar to that disclosed in the Booth et al. differential pressure measuring apparatus patent application, Serial No. 248,358, filed September 26, 1951; now Patent No. 2,808,725. The main difference between the apparatus shown in the Booth et al. application and the unit 2 shown in Fig. 1 of the drawings is that in Fig. 1 the force to be measured is applied to the left end of the beam 33 in lieu of the right end as in the Booth et al. application. Another difference is that in Fig. 1 of the drawings the upper pressure chamber 34 of unit 2 is shown vented to atmosphere through a vent 35 and the lower pressure chamber 36 is shown likewise vented to atmosphere through the vent 37. In the Booth application, neither of these chambers are vented to atmosphere.

Fig. 1 of the drawings also shows a transmitting line 38 for transmitting an air supply from a suitable source, not shown, through the conduit 39 to the specific gravity transmitting unit 2 as well as to the pneumatic receiving and recording means 3.

Fig. 1 also shows a transmission line 41 for transmitting an output signal from the transmitter unit 2 to a pneumatic receiving unit, not shown, inside the recorder 3. In Fig. 1 there is shown a pen 42 for recording changes in pressure being transmitted through the conduit 41 on a chart 40. It should be clearly understood that the prime object of the invention is to provide a specific measuring apparatus of the type already described which will accurately measure the specific gravity of any type of fluid flowing through a transmission line regardless of whether the fluid is an aqueous drilling fluid, a well conditioning fluid such as cement slurries, cement mud jel slurries, water-mud mixtures, oil-mud mixtures such as are used in drilling or conditioning of well bores or be a fluid that is a mixture of either metallic or non-metallic slurry material such as are used used in benefication processes and in the field of metal dressing.

In order to illustrate one of the many aforementioned applications in which the specific gravity measuring apparatus set forth in this application may be used, there is illustrated in Fig. 5 of the drawing a Dorrco fluo solids system that is employed in the roastings of sulphides for sulphur dioxide production. As shown in this Fig. 5, a conduit 43 transmits a supply of water and a second conduit 44 transmits a supply of pyrites ore to a log washer 45. The log washer 45, in turn, transmits a mixture of the water and pyrites ore through the conduit 46 to a make-up tank 47. A conduit 48 transmits a mixture of the pyrites ore and water from the make-up tank 47 to a pump 49 and a conduit 6 connects the discharge side of this pump 49 with the cross 4 shown in Fig. 1 of the drawings. A transmission conduit 28 in Fig. 5 of the drawing is shown transmitting a flow of fluid from the container 1 to a slurry storage tank 51. In this storage tank there is schematically shown a paddle device which is continually rotated in the tank to prevent settling out of the pyrites ore in the mixture transmitted thereto. A conduit 53 is shown connecting the slurry storage tank 51 with a pump 54. The pump 54 in turn is connected by means of a conduit 55 to a head tank 56. A conduit 57 connects the upper portion of the head tank 56 with the slurry storage tank 51 and a conduit 58 connects the head tank 56 with a pump 59. The slurry being pumped by pump 59 in turn is transmitted by way of a conduit 61 to a fluo solid reactor 62.

In the operation of the aforementioned system Dorrco fluo solids system as shown in Fig. 5 finely crushed pyrites ore with a specific gravity of approximately five is fed through conduit 46 into the make-up tank 47 where it is mixed with water. This mixture is pumped into the top of a large storage tank 51 which is constantly agitated by a large paddle to prevent settling out of the pyrites ore. The slurry is then pumped from the bottom of the storage tank to the top of a head tank 56 and is then pumped into the reactor 62.

Heretofore, the method of determining the specific gravity of the slurry entering the reactor was by weighing a sample from the constant head tank 56 every two hours. If the specific gravity was too high, more water was added or less pyrites ore was fed into the make-up tank 47. When the density was low, less water was added or more pyrites was fed into the make-up tank 47. Such procedures required periods of about two hours before such a change in the make-up tank 47 could be felt in the slurry passing through the constant head tank 56. Development of the specific gravity measuring apparatus as shown in Fig. 1 permitted such a measuring apparatus to be located in such a Dorrco fluo solids system such as is shown in Fig. 5 between the make-up tank 47 and the top of the storage tank 51. With this arrangement, the pump 49 is able to pump the slurry from such a make-up tank 47 through the sampling chamber 1 to the storage tank 51. With the specific gravity measuring chamber 1 placed in this position an accurate specific gravity or density reading on the recorder 3 may be obtained only a few minutes after the slurry of pyrites and water has left the make-up tank 47.

As a flow of slurry passes through the transmission 6, it will first pass through the cross 4 and thence through the flexible conduit 12 and inlet port 15 into the portion of the chamber formed by the first wall portion 16 and the baffle 17. As the rapidly moving slurry is pumped into the chamber in this manner it will be impinged against the wall portion 16 in the manner shown in Fig. 4. As this action occurs the pulse in the fluid caused by the pumping action of the pump 49 will be removed. Part of the slurry shown in Fig. 5 that is impinged against the wall 16 of the sampling chamber will drop in a downward direction to the lower portion of this chamber. Another portion of the fluid that has been impinged against the wall will be caused to move in an upward direction over the baffle plate 17 and dropped in a downward direction on the part of the chamber containing the displacer 29. As the flow of fluid continues to pass through the chamber the impinged fluid which is dropped directly to the lower portion of the sampling chamber 1 will tend to fill up the funnel-shaped open drain 24.

Should this rapidly rising slurry still contain any undesirable pulses or surges the lower angularly bent portion 22 of the baffle 17 will prevent such pulses or surges from affecting erroneous aparent weight changes of the displacer element 29. While not generally necessary, it may also be advantageous in some specific gravity or density measuring applications to use the previously mentioned fluid that was impinged against the chamber portion 16 and dispersed in an upward direction over the baffle 17 to the other side of the baffle as a means of dampening out any pulses or surges that may still be in the fluid that has dropped to the bottom of the chamber and is in the process of rising in an upward direction in the portion of the chamber enclosed by the wall portion 23. The impinged fluid flowing in this upward direction over the baffle 17 will thus in effect tend to evenly dissipate, by its force in dropping to the other side of the baffle, any surges in the slurry that is rising in the portion of the chamber that contains the displacer 29.

When the slurry in the displacer chamber 29 rises to a level of the outlet port 27 it will flow from the sampling chamber 1 through the conduit 28 to the slurry storage tank 51 previously described.

As the slurry passes through the sampling chamber in the aforementioned manner minute particles in such slurry materials tend to settle out of the slurry and drop to the bottom of the chamber 1 and if not removed would accumulate in the chamber and cause the displacer element 29 to transmit erroneous apparent weight changes to the recorder 3.

To overcome this particle dropping out problem the sampling chamber 1 of the present invention is shown containing a funnel-shaped open drain 24. As such solid particles tend to settle out of the slurry, as the slurry is being transmitted through the sampling chamber 1, such particles will tend to gravitate to the lower portion of this drain 24 and be discharged into the rapidly flowing stream of slurry that is flowing through the cross 4 to the flexible hose 12 and inlet port 15. As such solid particles are permitted in the aforementioned manner to drop into such a slurry stream they will be dissipated into the rapidly moving stream and thus be caused to be more homogeneously mixed with the inflowing slurry.

With this particle breaking up arrangement it can thus be seen that the apparent weight of the displacer 29 will not be affected by solid particles dropping out of the slurry as the fluid is being pumped through the chamber 1.

The detecting unit used in this case at bar is the displacer 29 which is suspended in the slurry in the sampling chamber. A density change is detected by the apparent change in weight of this displacer 29 which results from a changed buoyant force of the slurry acting on the displacer. This apparent change in weight of the displacer 29, which varies exactly with the specific gravity of the slurry, is then transferred to the transmitting unit 2 by way of the rod 31.

The relationship between the apparent weight of the displacer 29 shown e.g. in Fig. 1 and the specific gravity of the slurry is as follows:

Assuming that A.W. is equal to the apparent weight of displacer in pounds,

T.W. is equal to true weight of displacer in pounds,
V is equal to the volume of displacer in cubic feet,
B.F. is equal to the buoyant force of the slurry in pounds, and
S.G. is equal to the specific gravity of the slurry, and
A.W. is equal to T.W.—B.F. since density of water under standard conditions of temperature and pressure is equal to 62.4 pounds per cubic foot,
B.F. will then be equal to 62.4 (V) (S.G.), or A.W. be equal to T.W.—62.4 (V) (S.G.)

Since T.W. and V are constants for any given installation, the apparent weight, A.W., varies inversely with specific gravity, S.G. The actual, or true, weight of the displacer 29 is always made heavier than the weight of the volume of slurry displaced in the sampling chamber 1.

The pressure transmitter 2 is used to measure the apparent change in weight, A.W., of the displacer 29. The transmitter 2 works on the pneumatic-balance principle, wherein a force resulting from a change in the variable is opposed by a pneumatic force, and this opposing force is a measure of the variable. The apparent change in weight of the displacer in this case is the variable. Since forces are balanced rather than motion, the movement of the unit is held to a very small value.

By pivotally connecting and suspending the displacer 29 from the primary beam 33 of the transmitter, a different pneumatic signal can be obtained for every change, or apparent change, in weight of the displacer 29. This pneumatic signal is then transmitted to a pneumatic receiver inside the recorder 3 which continuously indicates and records these changes in units of specific gravity by means of the pen 42 on a chart 40. Such a transmitter 2 can be calibrated to produce a linear pneumatic signal that corresponds to a range in specific gravity e.g. from 2.00 to 4.00 with an accuracy and readability to better than 0.02 specific gravity.

From the above description of the specific gravity measuring apparatus it can thus be seen that the present invention provides an accurate means of measuring the specific gravity or density of a rapidly moving fluid passing through a sampling chamber.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims and that in some cases certain features of the invention may sometimes be used to advantage without a corresponding use of other features.

Having now described my invention, what I claim as new and desire to secure by Letters Patent is:

1. An apparatus for continuously measuring the specific gravity of a rapidly flowing slurry material containing solid particles therein, comprising a container, a spaced apart slurry inlet port and slurry outlet port formed in a wall portion of the container adjacent an upper open end of said container, a slurry inlet conduit having one of its ends connected to said container wall portion forming said inlet port, a partial baffle plate connected to the inner wall of said container and positioned to separate a first wall portion of said container having said inlet port formed therein from a second wall portion of said container having said outlet port formed therein, an open drain formed by the lower end wall portion of said container, an inverted T-shaped pipe fitting having its vertical branch communicating with and forming an extension of said lower end wall portion of said container, one horizontal end branch of said inverted T-fitting being in communication with a transmission conduit and the other horizontal end branch of said fitting being in communication with the other remaining end of said inlet conduit; said transmission conduit, horizontal end branches of said inverted T-fitting, said inlet conduit and inlet port formed in said wall of said chamber jointly providing a means by which said rapidly flowing slurry to be measured can be continuously transmitted into said container, said open drain, inverted T-fitting and said inlet conduit connections affording a means of withdrawing any settled-out portions of said solid particles located in the bottom of said container into said horizontal portion of said inverted T-fitting as said rapidly moving slurry to be measured passes through said last-mentioned portion of said inverted T-fitting, the size of the settled-out portions of said particles entering said rapidly moving slurry in said horizontal portion of said inverted T being reduced as they enter said horizontal portion and are hit and broken up by the force of the rapidly moving solid particles in said rapidly moving slurry being transmitted by way of said transmission conduit, said horizontal branch portion and said inlet conduit through said inlet port to said container, a slurry outlet conduit having one of its ends connected to said container wall forming said outlet port to continuously carry the measured slurry containing no settled-out particles out of a top portion of said container away from said container as said incoming slurry containing said solid particles are being transmitted to said container, a displacer element positioned in said container between said baffle plate and said last mentioned wall portion and a force balance transmitting unit connected to said displacer and a recording means operably connected to said transmitting unit for recording apparent changes in weight of said displacer as said slurry material is transmitted from said inlet port to said outlet port.

2. An apparatus including a chamber having a displacer element, for making an extremely accurate measurement of the specifice gravity of a continuously flowing slurry containing solid particles which is flowing into, through and out of the upper portion of said chamber, comprising a flexible elongated inlet conduit, said inlet conduit being bent into an elongated hook-shaped configuration and having one of its ends connected to an inlet port formed in a wall portion of said chamber, an open drain formed by the lower end wall portion of the chamber, an inverted T-shaped pipe fitting having its vertical branch communicating with and forming an open drain extension for said lower end wall portion of said chamber, one horizontal end branch of said inverted T-fitting being in communication with a transmission conduit and the other horizontal end branch of said inverted T-fitting being in communication with the other remaining end of said inlet conduit; said transmission conduit, horizontal end branches of said inverted T-fitting, inlet conduit and inlet port formed in said wall portion of the chamber jointly providing a means by which said rapidly flowing slurry to be measured can be continuously transmitted under pressure into one of two connecting compartments formed in said chamber, and said open drain and open drain extension affording a means of draining the solid particles in said slurry settling to the bottom of said chamber into the rapidly moving slurry to be measured which is flowing from said transmission conduit between said horizontal end branches of said inverted T-fitting into said inlet conduit to thereby enable settled-out portions of particles which enter said rapidly moving slurry to be reduced in size by the force applied to these portions of particles by the solid particles contained in said rapidly moving slurry.

References Cited in the file of this patent

UNITED STATES PATENTS

| | | |
|---|---|---|
| 671,075 | White | Apr. 2, 1901 |
| 1,384,886 | Brindle | July 19, 1921 |
| 1,992,261 | Traudt | Feb. 26, 1935 |
| 2,445,255 | Younkin | July 23, 1948 |
| 2,590,872 | Kraft | Apr. 1, 1952 |

FOREIGN PATENTS

| | | |
|---|---|---|
| 839,703 | France | Jan. 7, 1939 |